June 2, 1931.  O. E. FLORANG  1,808,650
WIRE HANDLE FOR CONTAINERS
Filed July 18, 1930
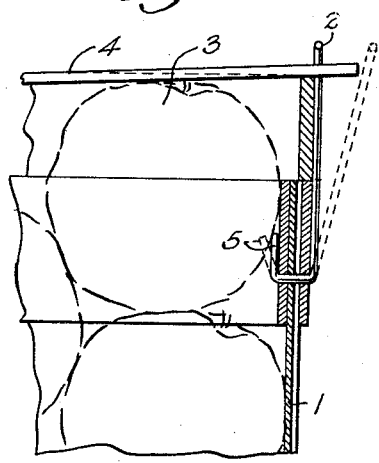
Fig. 1.
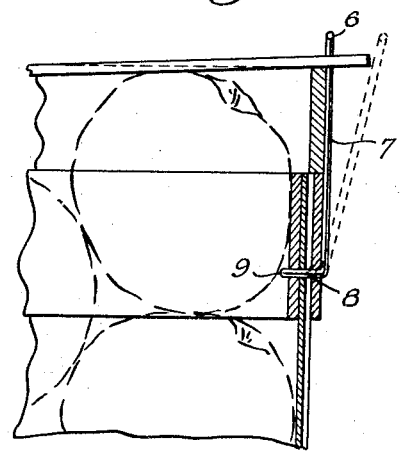
Fig. 2.
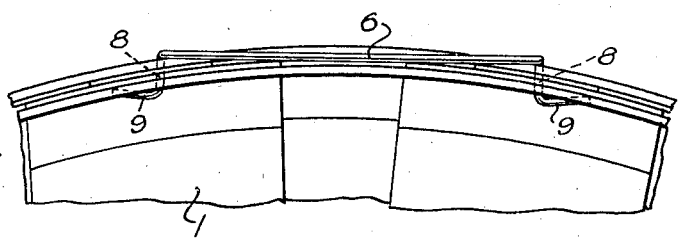
Fig. 3.
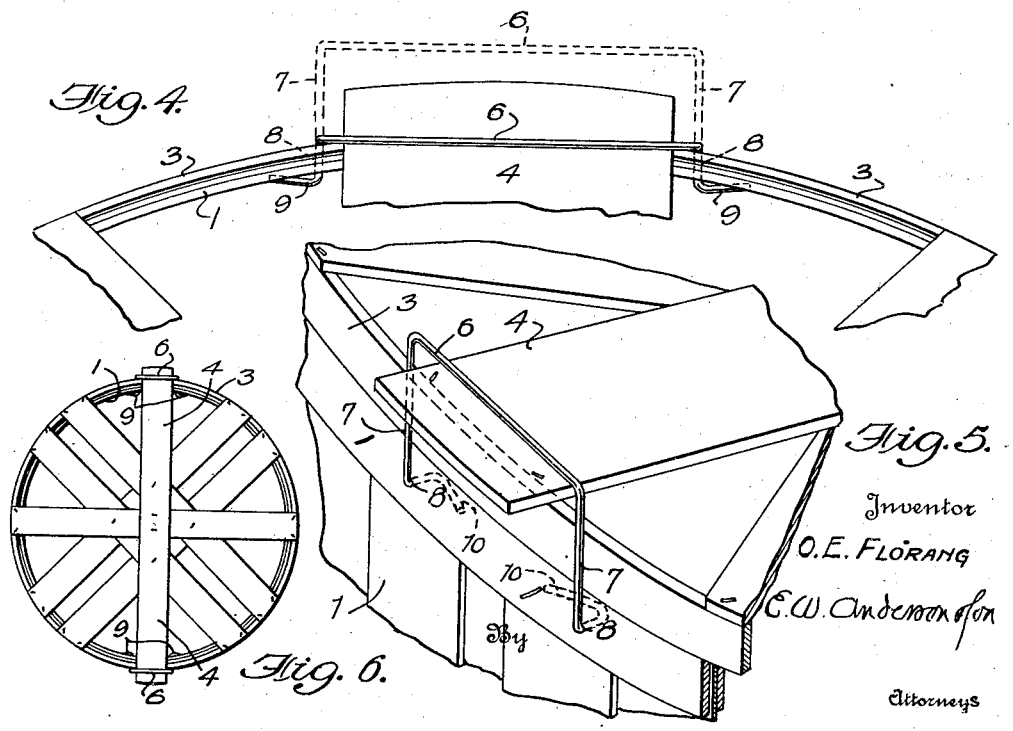
Fig. 4.
Fig. 5.
Fig. 6.
Inventor
O. E. Florang
E. W. Anderson
By
Attorneys Patented June 2, 1931

1,808,650

UNITED STATES PATENT OFFICE

OSCAR E. FLORANG, OF BURLINGTON, IOWA

WIRE HANDLE FOR CONTAINERS

Application filed July 18, 1930. Serial No. 468,810.

The invention has relation to the wire handles of bushel baskets and other containers wherein upright handle loops project upwardly above the basket at each side thereof, the bifurcations of the wire loop handles being clinched on the inner side of the basket by loose terminal bends or clincher arms in contact with the inner side of the basket.

It has been customary time out of mind to bend these clincher arms in upright fashion parallel with the bifurcations of the handle loops, whereby when the upright handle loops are bent outwardly and inwardly in the necessary manipulations thereof, said clincher arms will extend inwardly of the basket, which is found in practice to puncture and injure from two to four of the best apples or other fruit at the top of the basket, which in view of the large number of baskets of apples and other fruit marketed each season amounts to a very considerable loss each year, in that the injured fruit must be sold at a loss if it sold at all.

It is the object of the invention to so apply these wire handles to the baskets in a simple and inexpensive way that this loss will be eliminated and a great saving effected.

The invention consists in the novel construction and combinations of parts as hereinafter set forth.

In the accompanying drawings illustrating an embodiment of the invention:

Figure 1 is a side view of the ordinary wire handle as applied to a basket shown in section, the bent position of the handle being in dotted lines.

Figure 2 is a similar view of applicant's wire handle.

Figure 3 is a plan view of the same.

Figure 4 is a similar view showing the center slat, the bent position of the handle being in dotted lines.

Figure 5 is a fragmentary perspective view of the basket, showing the invention applied thereto, in modified form.

Figure 6 is a plan view of the basket as a whole.

In these drawings the numeral 1 designates a bushel basket, provided at opposite sides with upright wire handle loops 2 extending above the top of the basket, and 3 is a cover, provided with a diametric slat 4 which is longer than the other slats thereof and projects endwise of said cover into engagement with the said upright handle loops to hold the cover in place, no other securing means being employed for said cover. When the cover is put on the basket after it is packed or when said cover is to be removed, the handle loops are bent outwardly or backwardly so that the longer diametric cover slat may be engaged with or disengaged from the handles. As a result, if the wire handles are made as in the past, the terminal bends or clincher arms 5, in the necessary manipulations of said handles will extend inwardly of the basket as shown in Fig. 1 in dotted lines, and said clincher arms will bite into and injure from two to four of the best apples in the basket, the best fruit being always placed in the topmost layer.

In the present case, the wire handle loops 6 have the bifurcations 7 thereof provided with lower bends or fastener members 8 extending through the sides of the basket and terminal bends or clincher arms 9 lying substantially parallel to the axis of bending between said loop and said fastener members close to the inner wall of the basket, and when the cover of the basket is to be applied or removed as explained, these clincher arms in the necessary manipulations of said handle loops will have no tendency to and will not become distorted or bent inwardly of the basket, to thereby bite into and injure the fruit in the basket.

A modification of the invention is shown in Fig. 5, wherein the clincher arms 10 extend towards each other close to the inner circumferential wall of the basket.

In the main form of the invention, the points of the clincher arms 9 which extend away from each other will tend to remain closer to the inner side of the basket, due to the curve of the basket running towards the points or ends of these bends.

This is explained by the fact that if for example the clincher arms 9 and 10, in both main form and modification are at the same angle, there will be a convergence of said clincher arms with the inside curve of the basket in the main form and a divergence in the modification.

I claim:—

1. In combination, a container, a wire loop having fastener members integral therewith, passing loosely transversely through the wall of said container, said fastener members including a clincher arm disposed close to the inner wall of the container, said loop bendable into different positions relative to said fastener members, and said clincher arm lying substantially parallel to the axis of bending between said loop and said fastener members.

2. In combination, a basket, a wire loop basket fastener members integral therewith, passing loosely transversely through the wall of the basket, said fastener members including each a clincher arm disposed close to the inner wall of the basket, said loop being bendable into different positions relative to said fastener members, and said clincher arms lying substantially parallel to the axis of bending between said loop and said fastener members.

3. In combination, a basket, an integral wire loop having its end portions bent to form fastener members passing loosely transversely through the wall of the basket, said fastener members having terminal bends forming clincher arms disposed circumferentially of the basket close to the inner wall thereof, said loop being bendable into different positions relative to said fastener members, and said clincher arms lying substantially parallel to the axis of bending between said loop and said fastener members.

4. The combination with a basket having a marginal rim around the top, of a wire handle having spaced depending legs extending downwardly along the outer side of the basket rim, thence inwardly through apertures in the rim and terminating in portions which extend circumferentially along and are clinched against the inner face of the basket rim.

5. The combination with a basket having a marginal rim around the top, of a wire handle having spaced depending legs extending downwardly along the outer side of the basket rim, thence inwardly through apertures in the rim and terminating in horizontal portions which extend circumferentially along and are clinched against the inner face of the basket rim.

In testimony whereof I affix my signature.

OSCAR E. FLORANG.